US008990501B1

(12) United States Patent
Sellers et al.

(10) Patent No.: US 8,990,501 B1
(45) Date of Patent: Mar. 24, 2015

(54) MULTIPLE CLUSTER PROCESSOR

(75) Inventors: Scott Sellers, Menlo Park, CA (US); Gil Tene, Los Altos Hills, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 115 days.

(21) Appl. No.: 11/250,149

(22) Filed: Oct. 12, 2005

(51) Int. Cl.
G06F 12/08 (2006.01)

(52) U.S. Cl.
CPC ........ G06F 12/0811 (2013.01); G06F 12/0888 (2013.01)
USPC ............................ 711/121; 711/122; 711/141

(58) Field of Classification Search
None
See application file for complete search history.

(56) References Cited

U.S. PATENT DOCUMENTS

| | | | | |
|---|---|---|---|---|
| 5,564,035 | A * | 10/1996 | Lai ................. | 711/144 |
| 5,694,573 | A * | 12/1997 | Cheong et al. ............... | 711/122 |
| 5,732,209 | A | 3/1998 | Vigil et al. | |
| 5,909,699 | A * | 6/1999 | Sarangdhar et al. .......... | 711/146 |
| 6,101,589 | A | 8/2000 | Fuhrmann et al. | |
| 6,108,721 | A * | 8/2000 | Bryg et al. ....................... | 710/22 |
| 6,253,292 | B1 * | 6/2001 | Jhang et al. ................... | 711/146 |
| 6,658,539 | B2 | 12/2003 | Arimilli et al. | |
| 6,738,864 | B2 | 5/2004 | Chauvel | |
| 6,751,706 | B2 | 6/2004 | Chauvel et al. | |
| 7,085,866 | B1 * | 8/2006 | Hobson et al. ................. | 710/117 |
| 2002/0073282 | A1 | 6/2002 | Chauvel et al. | |
| 2003/0009629 | A1 * | 1/2003 | Gruner et al. ................. | 711/130 |
| 2003/0120876 | A1 * | 6/2003 | Hass et al. .................... | 711/146 |
| 2003/0120877 | A1 | 6/2003 | Jahnke | |
| 2004/0022107 | A1 * | 2/2004 | Zaidi et al. ..................... | 365/202 |
| 2004/0088487 | A1 * | 5/2004 | Barroso et al. ................ | 711/122 |
| 2004/0117559 | A1 * | 6/2004 | Glasco et al. ................. | 711/141 |
| 2004/0117598 | A1 * | 6/2004 | Arimilli et al. ................. | 712/30 |
| 2004/0268052 | A1 * | 12/2004 | Glasco .......................... | 711/141 |
| 2005/0021871 | A1 * | 1/2005 | Georgiou et al. ............. | 709/250 |
| 2005/0108717 | A1 * | 5/2005 | Hong et al. ................... | 718/102 |
| 2005/0138230 | A1 * | 6/2005 | Raisch ............................ | 710/15 |
| 2005/0182915 | A1 * | 8/2005 | Devaney et al. ............... | 712/10 |
| 2005/0193174 | A1 * | 9/2005 | Arimilli et al. ............... | 711/118 |
| 2006/0059315 | A1 * | 3/2006 | Moll ............................. | 711/141 |
| 2006/0129777 | A1 * | 6/2006 | Hobson et al. ................ | 711/168 |
| 2006/0176890 | A1 * | 8/2006 | Clark et al. ..................... | 370/406 |
| 2007/0038814 | A1 * | 2/2007 | Dieffenderfer et al. ....... | 711/141 |

OTHER PUBLICATIONS

"The Imapct of Shared-Cache Clustering in Small-Scale Shared-Memory Multiprocessors", by Nayfeh et al. (0-8186-7237-4/96, 1996 IEEE), pp. 74-84.*
Lemieux et al. (Directional and Single-Driver Wires in FPGA Interconnect: ISBN: 0-7803-8652-3/04, published 2004), pp. 41-48.*
Definition of "point-to-point communication" from Microsoft Computer Dictionary, published 2002, pp. 2.*

(Continued)

*Primary Examiner* — Kaushikkumar Patel
(74) *Attorney, Agent, or Firm* — Van Pelt, Yi & James LLP

(57) ABSTRACT

A multiple processor system is disclosed. The processor system includes a first cluster including a first plurality of processors is associated with a first cluster cache, a second cluster including a second plurality of processors associated with a second cluster cache, and a cluster communication network between the first cluster and the second cluster for sharing data between the first cluster and the second cluster. The first cluster includes a first unshared connection to the cluster communication network and the second cluster includes a second unshared connection to the cluster communication network.

34 Claims, 9 Drawing Sheets

(56) References Cited

OTHER PUBLICATIONS

Georgiou et al. (A programmable scalable platform for next-generation networking, pp. 1-20) copyright 2004, ISBN 0-12-198157-6.*
Basak et al. (Designing Processor-cluster Based Systems: Interplay Between Cluster Organizations and Broadcasting Algorithms). Aug. 12-16, 1996, ISSN: 0190-3918 pp. 271-274.*
Luiz Andre Barroso, COMPAQ, Piranha: Designing a Scalable CMP-based System for Commercial Workloads, Apr. 27, 2001.
Barroso et al., Piranha A Scalable Architecture Based on Single-Chip Multiprocessing, In Proceeding of the 27$^{th}$ Annual International Symposium on Computer Architecture, Jun. 2000.
Gostin et al., The Architecture of the HP Superdome Shared-Memory Multiprocessor, 2005.
U.S. Appl. No. 10/908,587, filed May 18, 2005, Normoyle et al.
Quinn Jacobson, Sun Microsystems, Ultra SPARC®, IV Processors.
Tremblay et al., The MAJC Architecture: A Synthesis of Parallelism and Scalability, 2000 IEEE.
Bossen et al., POWER4 Systems: Design for Reliability, IBM Server Group, Austin TX.
Tendler et al., POWER4 System Microarchitecture, IBM, J Res & Dev, vol. 46, No. 1, Jan. 2002.
Peter N. Glaskowsky, IBM Raises Curtain on POWER5, Oct. 14, 2003.
McNairy et al., Montecito—The Next Product in the Itanium® Processor Family, Aug. 24, 2004.
Brian Case, Sun Makes MAJC with Mirrors, Dual On-Chip Mirror-Image Processor Cores Cooperate for High Performance, Oct. 25, 1999.
Sun Microsystems, UltraSPARC IV, Detailed View, http://www.sun.com/processors/UltraSPARC-IV/details.xml.
Lostcircuits, HP PA-8800 RISC Processor, SMP on One Chip, Oct. 19, 2001, http://www.lostcircuits.com/cpu/hp_pa8800/.
Hydra, A Next Generation Microarchitecture, http://www-hydra.stanford.edu/.

* cited by examiner

MULTIPLE CLUSTER PROCESSOR

BACKGROUND OF THE INVENTION

Improvements in semiconductor processing technology have resulted in gains in computer processor performance. Not only has semiconductor feature size been reduced to allow higher component density on a die, decreases in semiconductor defects have made larger die sizes more cost effective. This has allowed integration of multiple processors and multiple levels of cache hierarchy possible in a single integrated chip.

Processor cycle time and memory access time are two important performance measures that together contribute to overall processor performance. Processor clock frequency has been improving at a rate faster than improvements in memory access time, limiting processor performance due to relatively longer memory access time. With greater interest by processor engineers in this ever-widening processor-cycle/memory-access time gap, many different cache organizations in multi-processor system have been proposed. Typically today, each processor core on a multiprocessor chip has its own first level cache. First level cache is a level of cache in a cache hierarchy most closely coupled to a processing unit of the processor. Typically the level-one cache is the fastest and/or smallest cache level coupled to the processor. Depending on the size of the individual processor and the amount of cache required, a level-two of cache may be integrated on-chip or located off-chip. The level-two cache is coupled to the level-one cache and is often shared by more than one processor in multiprocessor systems.

FIG. 1A and FIG. 1B illustrate prior multiprocessor systems. In FIG. 1A, processors 102 and 104, each with its own level-one cache, are connected to shared level-two cache 108 through shared bus 106. Processors can effectively use a common level-two cache only up to a limited number of processors. As large numbers of processors use a single level-two cache, cache design becomes difficult. Since cache line conflicts increase with more processors, a higher degree of cache set associativity is required to maintain the performance of the cache. The bandwidth needed to supply data to and from the level-two cache increases as well. High bandwidth connections are especially difficult to build if long global wires are required to connect multiple processors to the level-two cache. These long global wires can limit the maximum frequency of the entire chip. In FIG. 1B, each processor (110 and 112) is connected to a corresponding level-two cache (114 and 116 respectively). The level-two caches are connected to each other through shared bus 118. Having only one processor connected to a level-two cache simplifies the level-two cache design requirements, but the performance benefits of a single shared level-two cache associated with multiple processors are lost. In the systems of FIG. 1A and FIG. 1B, the shared bus can saturate as more processors transfer data through the shared bus. Therefore, there exists a need to utilize better cache organizations for performance and scalability in multiprocessor chips.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multi-cluster chip is disclosed. In some embodiments, the chip includes multiple clusters connected together through a cluster communication network on a single die. Any data between the processors, caches, memory, or any chip component can be communicated through the cluster communication network. Each cluster contains multiple processors each with at least one private level of cache (e.g., L1 cache, L0 cache). Data in a private cache level may not be accessed directly by other processors. In some embodiments, only addresses are private in the cache level. Each processor may have multiple levels of cache hierarchy. In some embodiments, each cluster is associated with one or more shared levels of a cache (e.g., L2 cache, L3 cache). Data in a shared level of a cache may be accessed by more than one processor associated with the cluster. At least one shared cache level is coupled to at least one private cache level of each processor associated with the cluster. By dividing the processors into clusters that use a common cache level, the amount of set-associativity and bandwidth required by the common cache level can be optimized efficiently.

Figure 1A:
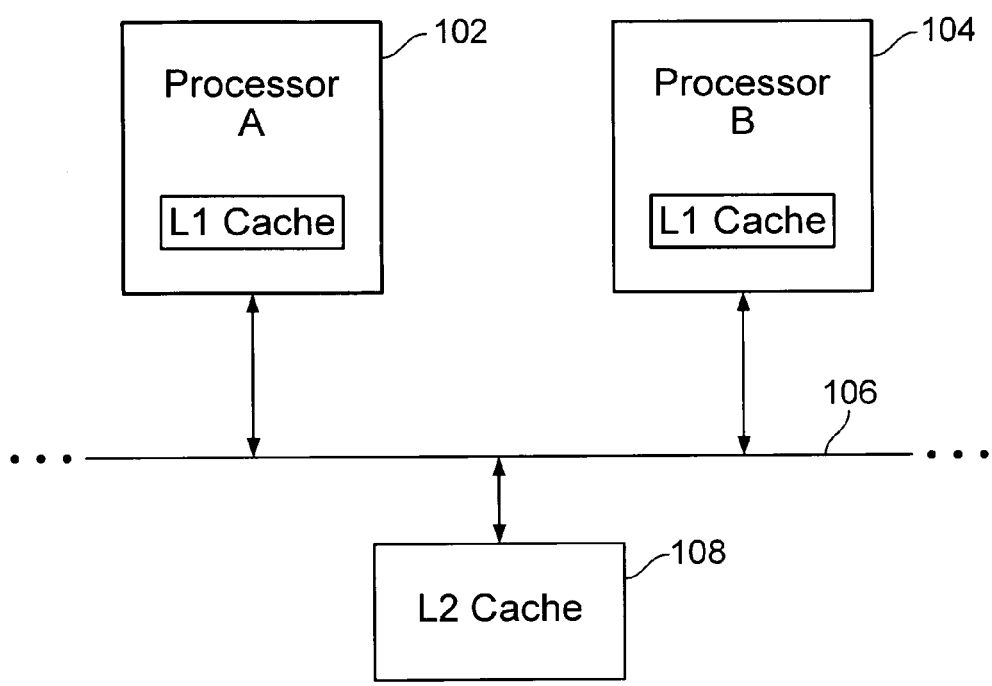
FIG. 1A and FIG. 1B illustrate prior multiprocessor systems.
Figure 1B:
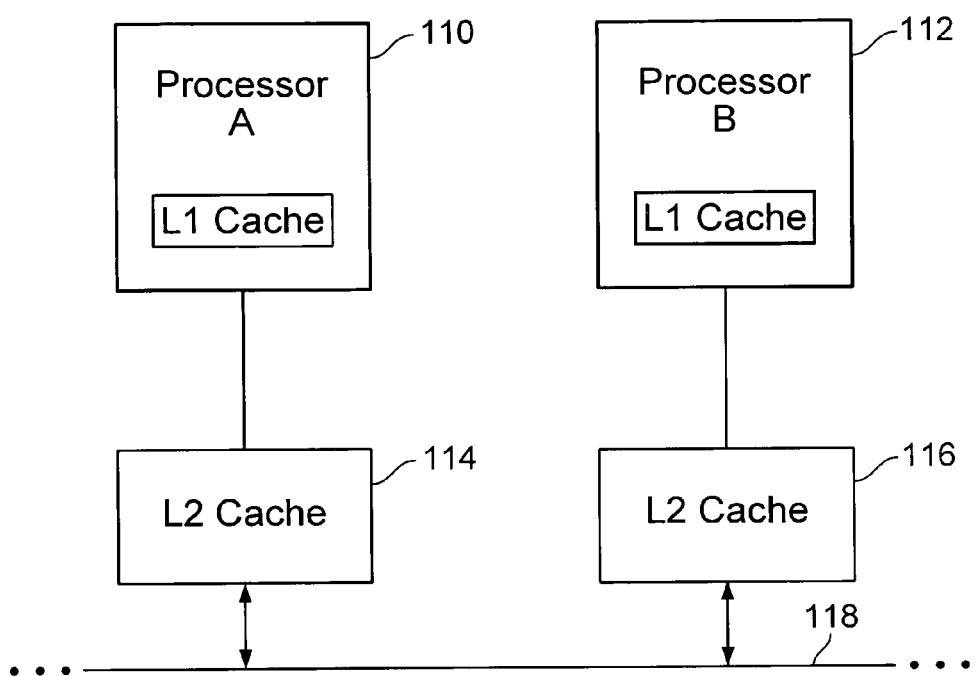

To obtain full performance of the clusters, high-bandwidth performance characteristics are desired in the cluster communication network. The common method for implementing a connection between functional units is a shared bus (i.e., as shown in 106 of FIGS. 1A and 118 of FIG. 1B). The shared bus includes more than one electrical driver connection and/or a bidirectional connection on a single wire. The shared bus works well for system designs with low bandwidth requirements, but it does not scale well as a larger number of units are added or as the bandwidth requirements of each unit increases. In some embodiments, the shared bus is time-multiplexed between the units desiring to use the bus. An on-chip shared bus is difficult to implement. Designing and testing the electrically shared bus can be challenging with tri-state buffer design and bus metastability problems that arise.

Figure 2A:
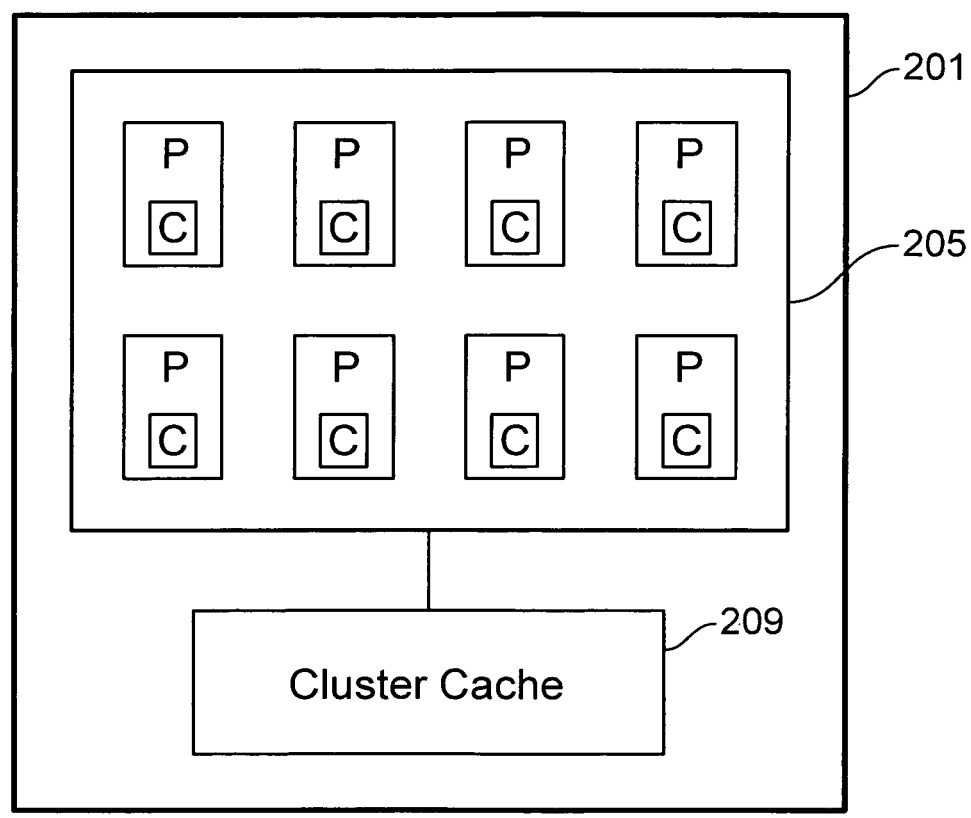
FIG. 2A illustrates an embodiment of a cluster.

FIG. 2A illustrates an embodiment of a cluster. Cluster 201 comprises multiple processors 205. In the example shown, eight processors are in the cluster. In other embodiments, two or more processors exist in the cluster. Each processor includes at least one private cache level. Processors 205 share at least one cache level included in cluster cache 205. In some embodiments, cluster cache 209 includes a shared cache level associated with processors 205. In some embodiments, cluster cache 209 includes a L2 cache level associated with processors 205. Any processor of processors 205 may access data in at least one shared cache level of cluster cache 209. The processors of a cluster and/or private cache level associated with the processors communicate with the cluster cache through any interconnect (e.g., cross bar, shared bus, electrically non-shared interconnects, single driver interconnect, point-to-point direct connection, switch connection, ring connection). Cluster cache 209 may comprise any cache organization, including any number of set associativity and any number of cache banks. In some embodiments, a cluster may be associated with a cache level not included in the cluster (e.g., off-chip L3 cache).

Figure 2B:
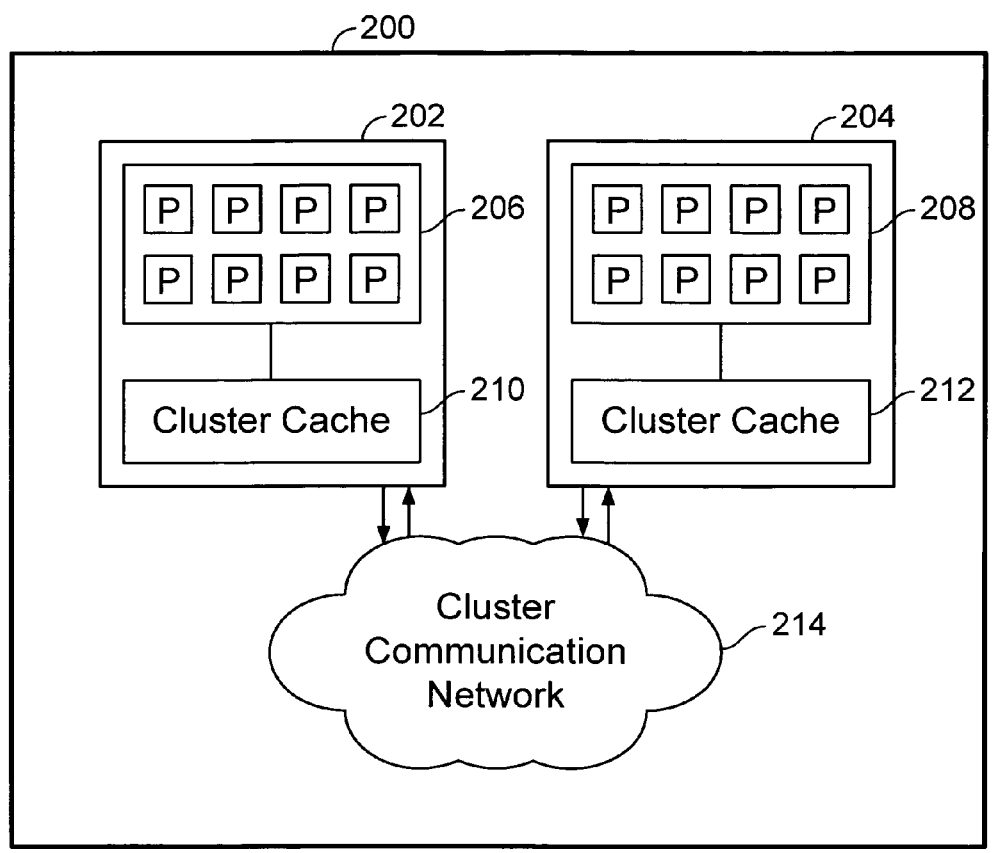
FIG. 2B illustrates an embodiment of a multi-cluster chip.

FIG. 2B illustrates an embodiment of a multi-cluster chip. In the example shown, chip 200 comprises two clusters, 202 and 204. In some embodiments the two clusters include at least one cluster of FIG. 2A. The chip may comprise any number of two or more clusters. Each cluster includes multiple processors (206 and 208 respectively for each cluster) and at least one cluster cache (210 and 212 respectively for each cluster) used by the processors of each respective cluster. Multiple clusters on the chip are connected together through cluster communication network 214. In some embodiments, an electrically shared connection links more than two components together. In some embodiments, an electrically non-shared (electrically unshared) connection links two components together. In some embodiments, a electrically non-shared (electrically unshared) connection includes a unidirectional connection with a single driver. The cluster communication network comprises electrically non-shared connections between components of the multi-cluster chip. Dedicated on-chip unidirectional interconnects connect the components together, eliminating the need for tri-state buffers and time-multiplexed data transfer. For example, all out going data from a cluster travels on a different electrically non-shared interconnect from any incoming data to the cluster. Out going data from each cluster travels on a different electrically non-shared interconnect from any out going data of another cluster. By not electrically sharing connections between the clusters, the on-chip bus design has been simplified, and the available bandwidth can be larger compared to using a traditional shared bus. Other components may be a part of the cluster communication network, including any component related to data communication, data routing, coherency, memory control, and cache control. In some embodiments, two chips, each with at least two clusters and a cluster communication network, are connected together.

Any data that needs to be transferred amongst the clusters on the chip are communicated through the cluster communication network. Two example categories of communication between the clusters are coherency communication and message passing. In coherency communication, a coherency protocol may be used to keep data related to a same memory location residing in cluster caches of two more or clusters consistent. For example, many clusters can be reading and using data from the same memory location. If one cluster modifies the data that is to be maintained coherent, other clusters need to be informed about the modification of the data. The cluster that requests to modify the data that is to be maintained coherent may send out an "invalidate" command to other clusters using the data before modifying the data. When other clusters receive the "invalidate" command, the clusters need to re-obtain the modified data from the cluster which modified it before the data can be used again.

In some embodiments, at least one cache level in cluster cache 210 and 212 are coherent. Coherency may be maintained on at least a portion of data in the private cache level of each processor and/or on at least a portion of data in the cluster cache. When coherency is maintained only on the private cache level, coherency data traffic may be communicated. In some embodiments, a cluster cache may be inclusive of at least one private cache level of processors associated with the cluster cache. For example, any data cached in a private level of a processor is also cached in a cache level associated with the cluster cache. When the cluster cache is inclusive of the private cache level, only cluster cache coherency data traffic needs to be sent between the clusters. This may reduce cluster-to-cluster coherency traffic bandwidth and/or overall coherency traffic bandwidth compared to when the cluster cache is not inclusive of the private cache level. Coherency traffic may grow proportionally with the number of clusters in a system and not necessarily with the number of processors in the system. Coherency of data in the private cache level of processors may be maintained by respective cluster cache of the private cache level. In some embodiments, a cluster cache is only inclusive of data that is maintained coherent in the private cache level of processors. For example, instruction data in the private cache level is not maintained coherent and not included in the cluster level cache. In some embodiments, at least some data maintained coherently in the private cache level is not cached in the cluster cache.

In message passing, messages are sent by one cluster to one or more other clusters. The messages may contain any data to be shared between the clusters. In some cases, messages to be passed are specified by the programmer. The cluster caches of clusters do not necessarily have to be coherent.

Figure 3:
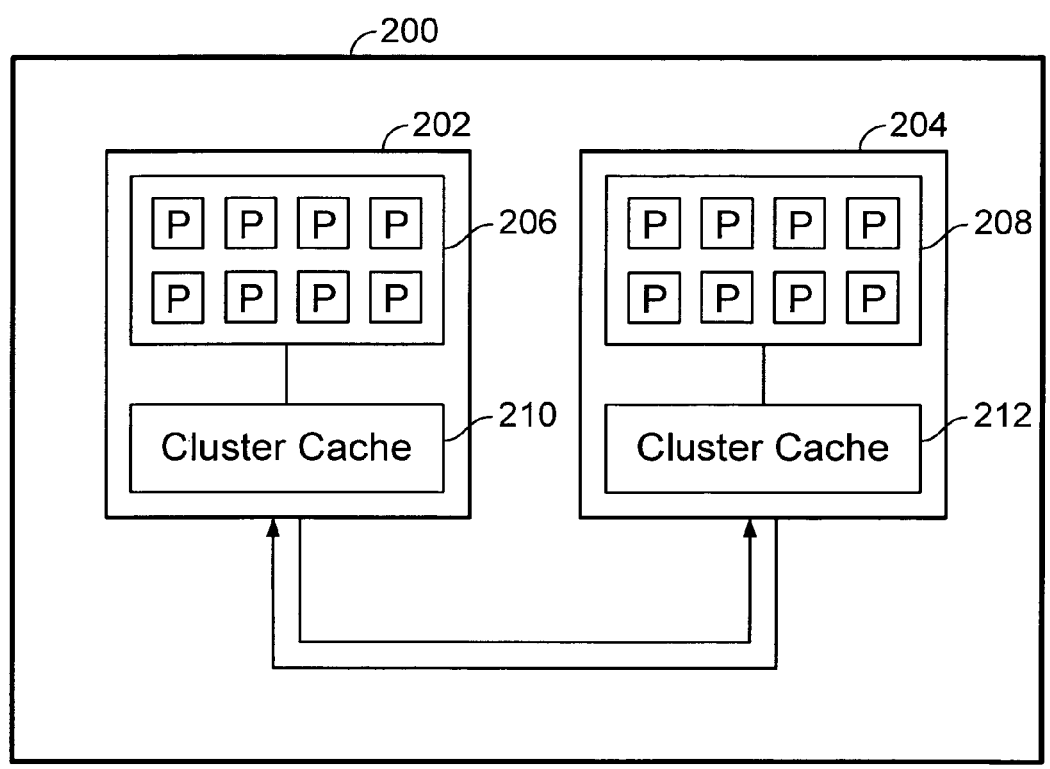
FIG. 3 illustrates an embodiment of a multi-cluster chip including a non-shared direct interconnect.

FIG. 3 illustrates an embodiment of a multi-cluster chip including an electrically non-shared direct interconnect. Clusters 202 and 204 are connected to each other by unidirectional interconnects. As more clusters are added, each new cluster requires two connections (one for receiving data and one for sending data) to other clusters. This can amount to 2*(N−1) total cluster connections for each cluster, where N is the total number of clusters. In some embodiments, not all clusters are directly connected to every other cluster. Some clusters may communicate with other clusters through another cluster. In some embodiments, the cluster are connected to other clusters using a combination of non-shared and shared interconnects.

Figure 4:
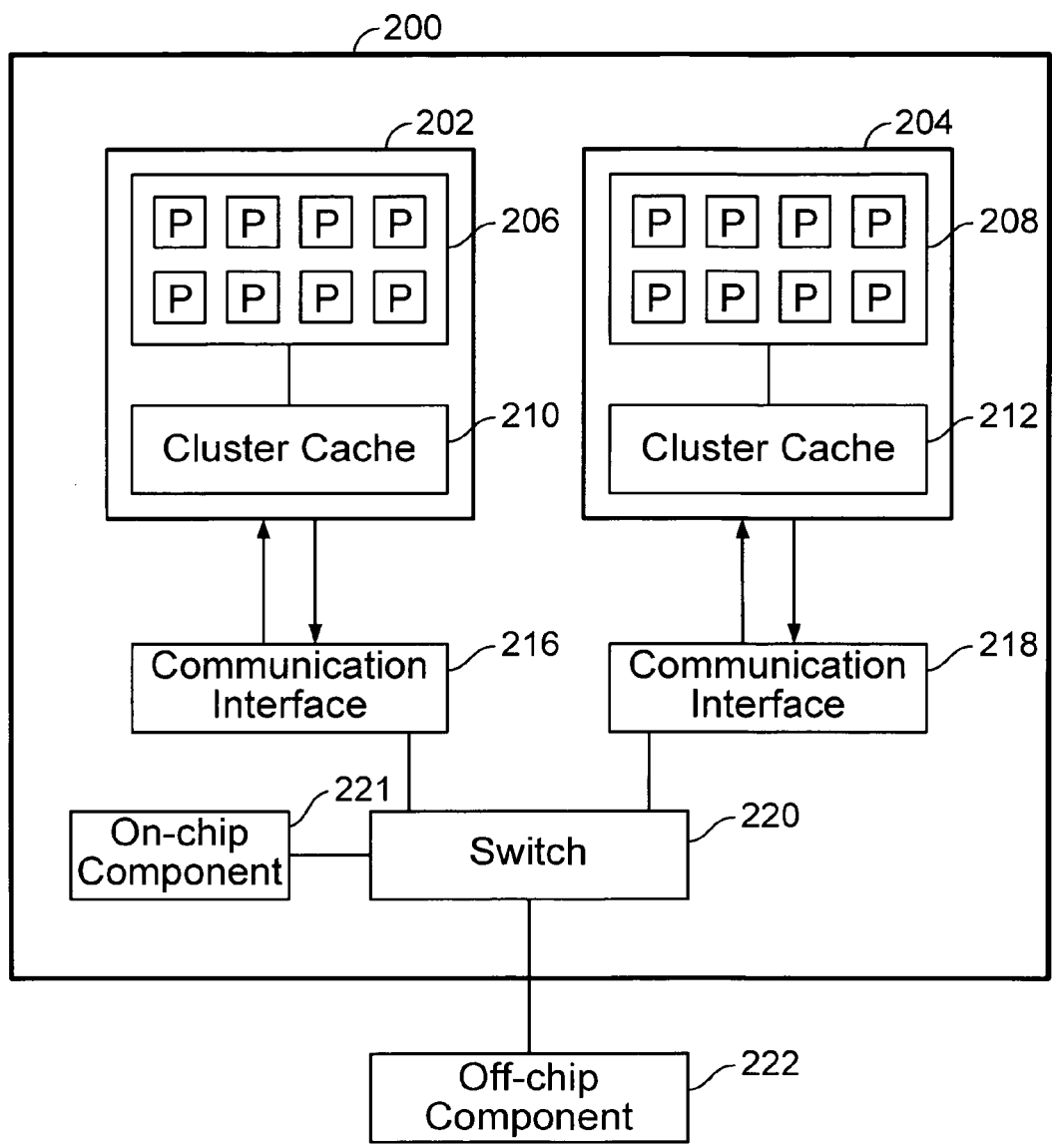
FIG. 4 illustrates an embodiment of a multi-cluster chip including an integrated switch.

FIG. 4 illustrates an embodiment of a multi-cluster chip including an integrated switch. Cluster 202 is connected to communication interface 216. Cluster 204 is connected to communication interface 218. The communication interfaces are connected together though switch 220. Any number of clusters and components can be connected to a communication interface. The switch routes data between various clusters and components either located on-chip or off-chip. More than one switch can exist on the chip. Many data routing components can comprise a single logical switch. When cluster 202 sends data to cluster 204, data is sent to communication interface 216 though an electrically non-shared interconnect. From communication interface 216, data is routed through switch 220 to communication interface 218 for delivery to cluster 204 through an electrically non-shared interconnect. As more processors are added to the chip, a corresponding communication interface is added to the chip or another connection is made to a pre-existing communication interface to enable data routing by the switch. Switch 220 is connected to on-chip component 221 and off-chip component 222. The switch is connected to zero or more on-chip components. The switch also may be connected to zero or more off-chip components. The components can be any component associated with processing, routing, caching, and storing data, including memory controller, i/o interface, snoop tag component, duplicate tag component, directory controller, and chip-to-chip links. Communication between clusters and the components are routed through the switch. Communication between the components can be routed through the switch as well. In some embodiments, a ring topology used instead of a switch. The ring topology may be a hierarchical ring topology.

Figure 5:
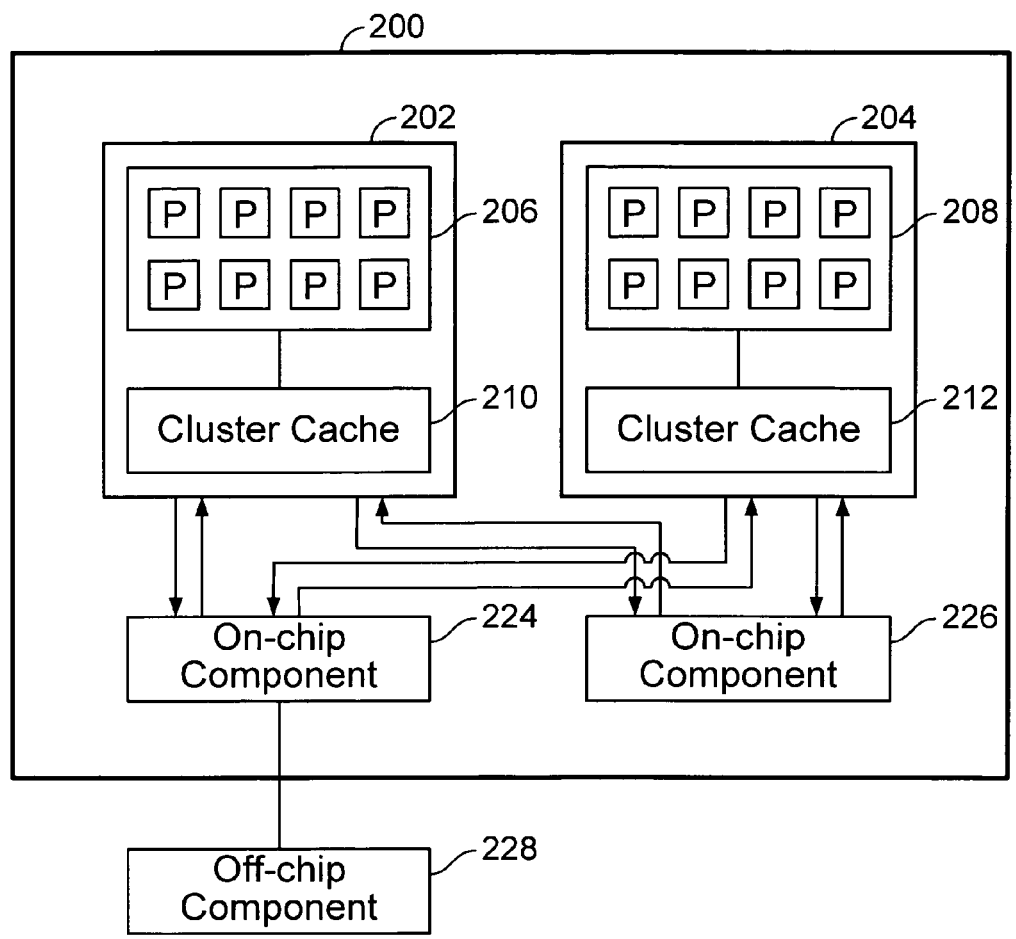
FIG. 5 illustrates an embodiment of a multi-cluster chip including on-chip components.

FIG. 5 illustrates an embodiment of a multi-cluster chip including on-chip components. Components can be any component associated with processing, routing, caching, and storing data. Cluster 202 and 204 are connected to on-chip component 224 and 226 through electrically non-shared interconnects. An on-chip component may be connected to any number of clusters and other on-chip components. Off-chip component 228 is connected to on-chip component 224. Any number of off-chip components can be connected to an on-chip component. Any number of on-chip components and off-chip components can exist. Communication between the clusters passes through one or more on-chip components. The component may perform additional processing associated with the data passing from one cluster to one or more clusters. For example, the components can be used to maintain cache coherence. A snoop tag component snoops memory traffic for accesses to memory that have been cached. In some embodiments, the clusters may be connected to each other directly.

Figure 6A:
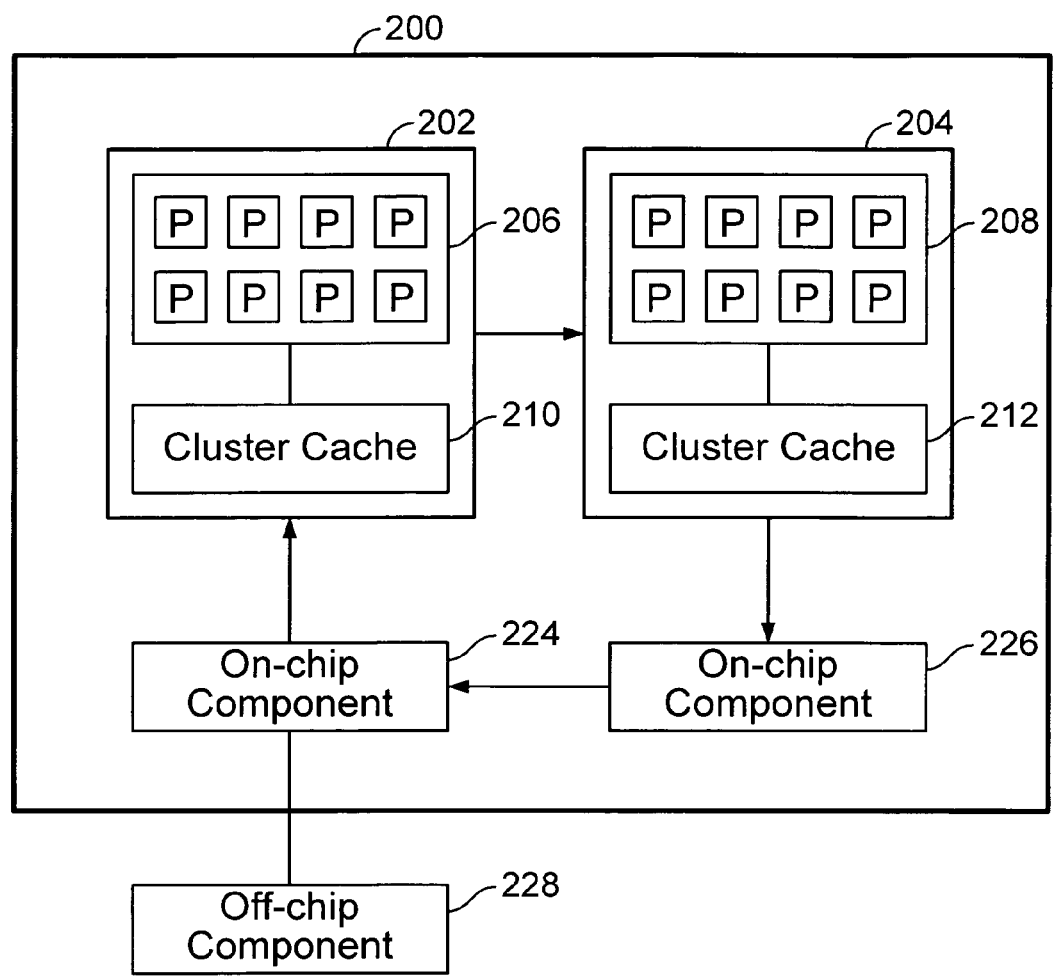
FIG. 6A illustrates an embodiment of a multi-cluster chip including components connected in a unidirectional ring configuration.
Figure 6B:
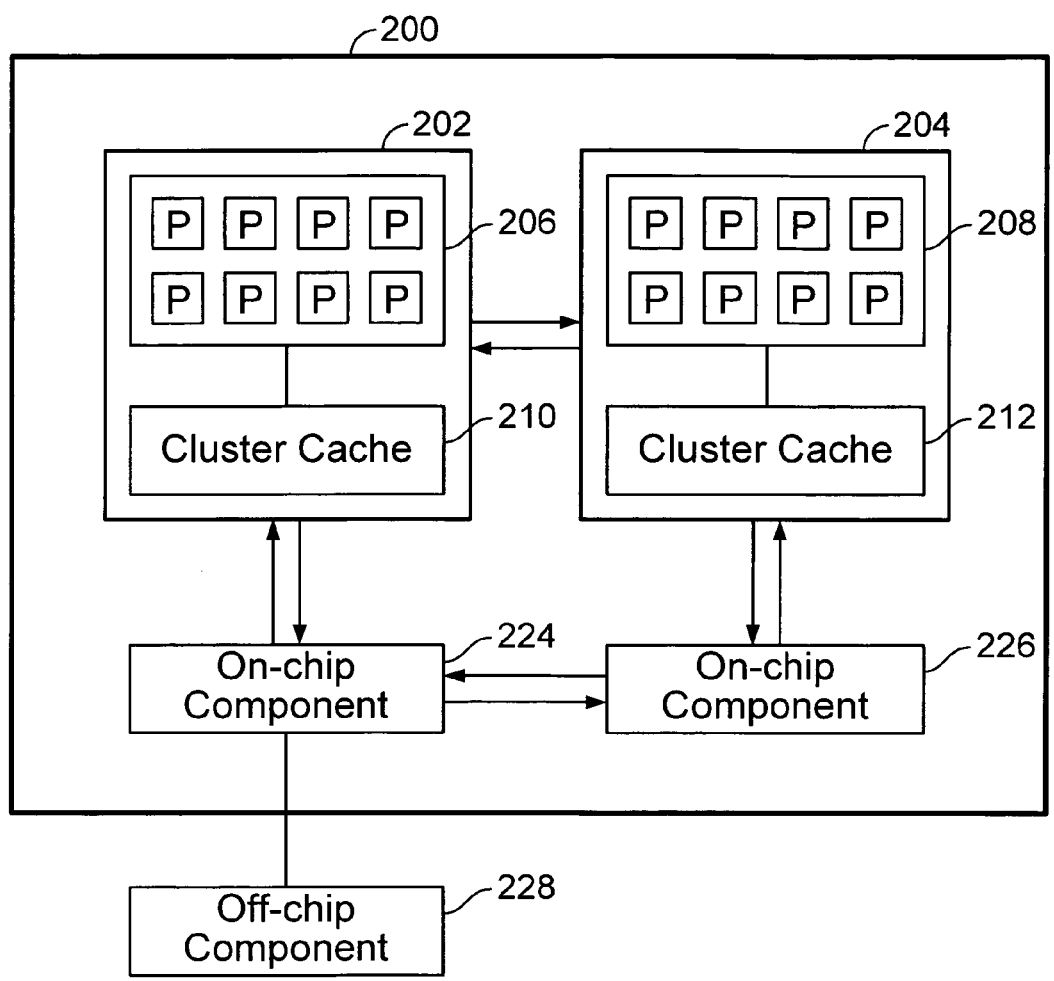
FIG. 6B illustrates an embodiment of a multi-cluster chip including components connected in a bidirectional ring configuration.

FIG. 6A illustrates an embodiment of a multi-cluster chip including components connected in a unidirectional ring configuration. Cluster 206, cluster 208, on-chip component 226, and on-chip component 228 are connected together thorough unidirectional electrically unshared connections. Data may travel only in one direction of the ring. A cluster may include only one input and one output connection to other clusters/components, wherein a cluster/component of the input connection is different from a cluster/component of the output connection. FIG. 6B illustrates an embodiment of a multi-cluster chip including components connected in a bidirectional ring configuration. Data may travel in both directions of the ring. A cluster/component may route data to other cluster/component in the ring connection. In the example shown, on-chip component 224 is connected to off-chip component 228. The off-chip component is optional. In some embodiments, more off-chip components exist.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A multiple processor system including:
    a first cluster including a first plurality of processors associated with a first cluster cache, wherein at least one of the first plurality of processors is associated with a first private cache level, wherein at least a portion of data in the first private cache level that is not maintained to be coherent is always not cached in a shared cache level included in the first cluster cache and data cached in the shared cached level is maintained to be coherent in the first private cache level;
    a second cluster including a second plurality of processors associated with a second cluster cache, wherein at least one of the second plurality of processors is associated with a second private cache level;
    a first communication interface connected to the first cluster via a first electrically non-shared interconnect, wherein the first communication interface is not included in the first cluster;
    a second communication interface connected to the second cluster via a second electrically non-shared interconnect, wherein the second communication interface is not included in the second cluster;
    an on-chip component comprising a first memory controller;
    an off-chip component comprising a second memory controller;
    a switch routing data between the first communication interface, the second communication interface, the first memory controller, and the second memory controller, wherein the first memory controller communicates with the first cluster and the second cluster via the switch; and
    a cluster communication network between the first cluster and the second cluster for sharing data between the first cluster and the second cluster;
    wherein:
        the first cluster, the second cluster, the first communication interface, the second communication interface, the switch, and the first memory controller are integrated on a first chip and can communicate with each other through on-chip components of the cluster communication network on the first chip;
        the second memory controller is on a second chip; and
        the cluster communication network spans at least the first chip and the second chip.

2. A multiple processor system as recited in claim 1, wherein the first cluster cache includes one or more cache levels shared by the first plurality of processors.

3. A multiple processor system as recited in claim 1, wherein the first cluster cache includes a L2 cache level.

4. A multiple processor system as recited in claim 1, wherein data is shared between the first cluster or the first cluster cache and the second cluster or the second cluster cache via the cluster communication network.

5. A multiple processor system as recited in claim 1, wherein data cached in the first private cache level is only accessible by a single processor associated with the first cluster, and the data cached in the second private cache level is only accessible by a single processor associated with the second cluster.

6. A multiple processor system as recited in claim 1, wherein coherency is maintained on at least a portion of data in the first private cache level.

7. A multiple processor system as recited in claim 1, wherein at least a portion of data in the second private cache level is always not cached in a shared cache level included in the second cluster cache.

8. A multiple processor system as recited in claim 1, wherein coherency between the first cluster cache and the second cluster cache is maintained.

9. A multiple processor system as recited in claim 1, wherein shared data is passed between the first cluster and the second cluster via the cluster communication network.

10. A multiple processor system as recited in claim 1, wherein a change to a cache line is communicated from the first cluster to the second cluster via the cluster communication network.

11. A multiple processor system as recited in claim 1, wherein messages are passed between the first cluster and the second cluster via the cluster communication network.

12. A multiple processor system as recited in claim 1, wherein the cluster communication network routes messages between the clusters.

13. A multiple processor system as recited in claim 1, wherein the cluster communication network routes information between the clusters and a cache coherency mechanism.

14. A multiple processor system as recited in claim 13, wherein the cache coherency mechanism is a snoop tag component, a duplicate tag component, or a directory controller.

15. A multiple processor system as recited in claim 1, wherein one or more components associated with processing, routing, caching, and storing data comprise the cluster communication network.

16. A multiple processor system as recited in claim 15, wherein the components include one or more of the following: a switch, a communication interface, a memory controller, a snoop tag component, a duplicate tag component, a directory controller, an i/o interface, and a chip-to-chip link.

17. A multiple processor system as recited in claim 1, wherein the first cluster cache and the second cluster cache are not coherent.

18. A multiple processor system as recited in claim 1, wherein the first chip is connected with another chip that includes two or more clusters and a cluster communication network.

19. A multiple processor system as recited in claim 1, wherein the cluster communication network routes data between one of the clusters and a cache level not included in the clusters.

20. A multiple processor system as recited in claim 1, wherein at least one cache level in the first cluster cache and at least one cache level in the second cluster cache are coherent.

21. A multiple processor system as recited in claim 1, wherein the first private cache level and the second private cache level are coherent.

22. A multiple processor system as recited in claim 1, wherein at least some coherency information is transferred from the first cluster cache to the second cluster cache via a first unshared connection; and at least some other coherency information is transferred from the second cluster cache to the first cluster cache via a second unshared connection.

23. A multiple processor system as recited in claim 1, wherein the third cluster cache is kept coherent with the first cluster cache and the second cluster cache.

24. A multiple processor system as recited in claim 1, wherein the cluster communication network comprises at least one on-chip component and at least one off-chip component.

25. A multiple processor system as recited in claim 1, wherein the on-chip component is at least a portion of a ring communication configuration.

26. A multiple processor system as recited in claim 25, wherein the off-chip component is not a part of the ring communication configuration.

27. A multiple processor system as recited in claim 25, wherein the ring communication configuration includes a unidirectional ring communication configuration.

28. A multiple processor system as recited in claim 25, wherein the ring communication configuration includes a bidirectional ring communication configuration.

29. A multiple processor system as recited in claim 1, further comprising a second on-chip component comprising a third memory controller.

30. A multiple processor system as recited in claim 29, wherein the on-chip component comprising the first memory controller and the second on-chip component comprising the third memory controller are at least a portion of a ring communication configuration.

31. A multiple processor system as recited in claim 30, wherein the off-chip component is not a part of the ring communication configuration.

32. A multiple processor system as recited in claim 30, wherein the ring communication configuration includes a unidirectional ring communication configuration.

33. A multiple processor system as recited in claim 30, wherein the ring communication configuration includes a bidirectional ring communication configuration.

34. A multiple processor system as recited in claim 1, wherein at least the portion of the data in the first private cache level that is not maintained to be coherent includes instruction data in the private cache level.

* * * * *